E. TASSIE.
SHUTTER FOR CINEMATOGRAPH MACHINES AND THE LIKE.
APPLICATION FILED APR. 15, 1919.

1,338,596.

Patented Apr. 27, 1920.
3 SHEETS—SHEET 1.

INVENTOR
EDWARD TASSIE
PER:- Rayner & Co.
ATTORNEYS.

E. TASSIE.
SHUTTER FOR CINEMATOGRAPH MACHINES AND THE LIKE.
APPLICATION FILED APR. 15, 1919.

1,338,596.

Patented Apr. 27, 1920.
3 SHEETS—SHEET 2.

INVENTOR
EDWARD TASSIE
PER:- Rayner & Co
ATTORNEYS.

E. TASSIE.
SHUTTER FOR CINEMATOGRAPH MACHINES AND THE LIKE.
APPLICATION FILED APR. 15, 1919.

1,338,596.

Patented Apr. 27, 1920.
3 SHEETS—SHEET 3.

INVENTOR.
EDWARD TASSIE.
PER:- Rayner &o
ATTORNEYS.

UNITED STATES PATENT OFFICE.

EDWARD TASSIE, OF SOUTH HACKNEY, LONDON, ENGLAND.

SHUTTER FOR CINEMATOGRAPH-MACHINES AND THE LIKE.

1,338,596.	Specification of Letters Patent.	Patented Apr. 27, 1920.

Application filed April 15, 1919. Serial No. 290,321.

*To all whom it may concern:*

Be it known that I, EDWARD TASSIE, subject of the King of Great Britain and Ireland, residing at 41 Glaskin road, South Hackney, in the county of London, England, have invented certain new and useful Improvements in Shutters for Cinematograph-Machines and the like, of which the following is a specification.

My invention relates to shutters for use in either taking or projecting cinematograph pictures but relates more particularly for use in projecting machines and the like.

In cinematograph projecting machines employing the usual type of shutter the periods of alternate full light and complete darkness tend to cause an objectionable flicker of the projecting picture upon the screen, and this flicker is liable to show in a more pronounced manner as the speed of rotation of the shutter decreases.

I have found that by allowing light to pass through the usual solid portion of the shutter in varying and controlled degrees in accordance with the speed of revolution of the shutter and speed at which the film is run, an improved effect is obtained for the picture projected upon the screen and a further advantage is also obtained in the saving of electric current, while still obtaining a good picture.

The object of my invention therefore is to automatically admit through what was the solid portion of the shutter an increasing or decreasing amount of light controlled by means of a governor and actuated by the rotation of the shaft rotating the shutter and this is obtained by means of opening and closing vanes arranged in two of the solid portions of the shutter in such a manner that they are closed when running at a normal or low speed but are opened more and more by a higher rotation of the shutter until they pass the maximum amount of light permissible by the control of the governing device.

In the accompanying drawings:—

Figure 1:
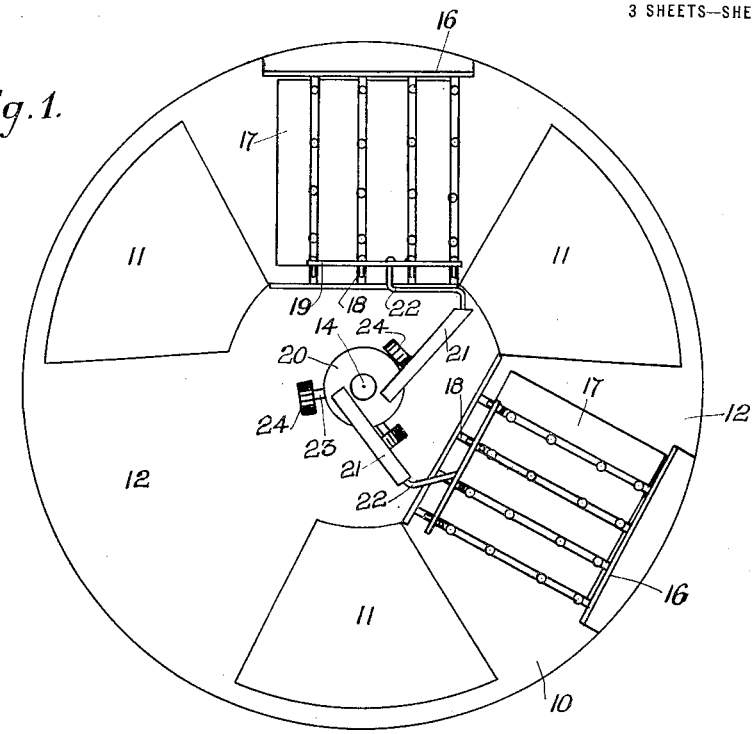
Figure 1 is an elevation of a shutter embodying my invention, the shutter vanes being shown closed.

Referring to the drawings 10 designates a circular shutter plate having a plurality of windows 11 symmetrically located therein, the spaces 12 between such windows being of such a width that the minimum flicker is produced when the shutter is rotated at normal speed. This shutter plate is mounted on a hub 13 which in turn is mounted on a horizontally arranged rotatable shaft 14, being fastened thereto in any convenient manner as by set screw 15. The shaft 14 is mounted in the projecting machine and is rotated in any convenient manner.

Figure 2:
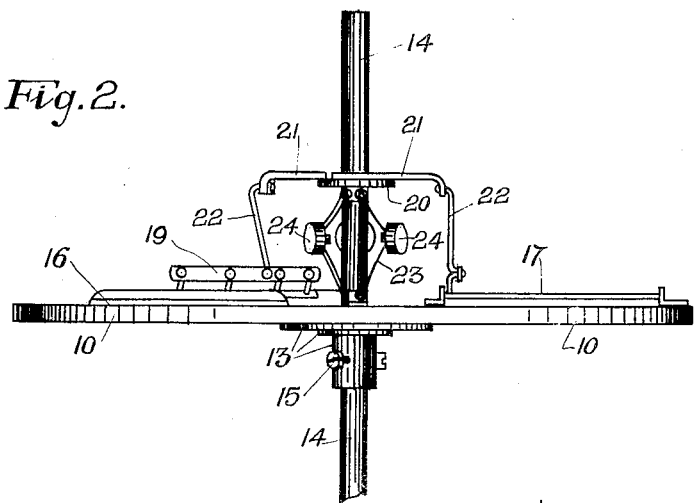
Fig. 2 is a plan view of the shutter showing also the governing device.
Figure 3:
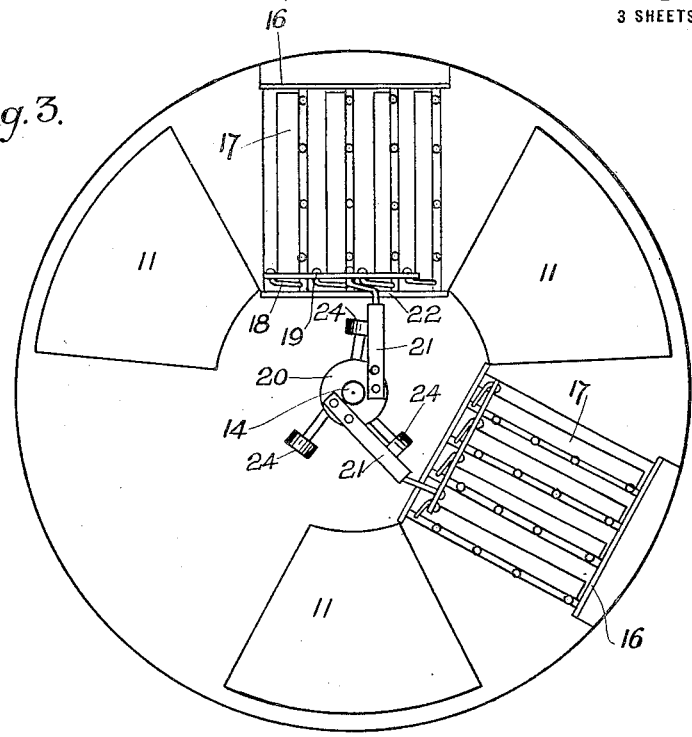
Fig. 3 is a view similar to Fig. 1, the shutter vanes being shown open.
Figure 4:
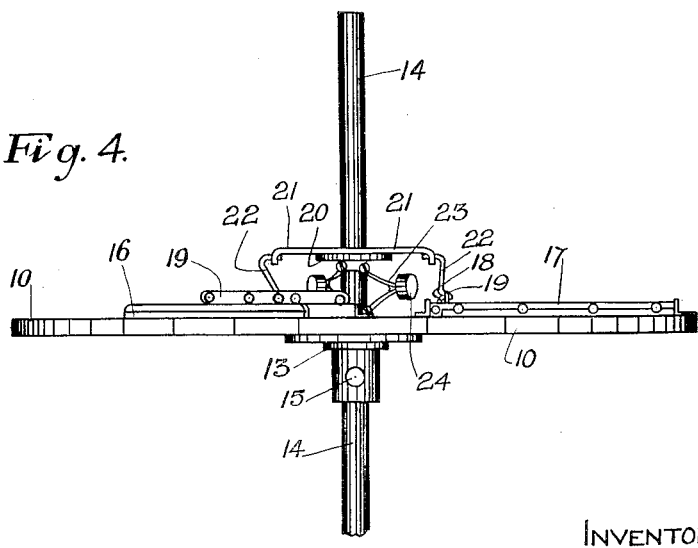
Fig. 4 is a plan view of the shutter and governing device.
Figure 5:
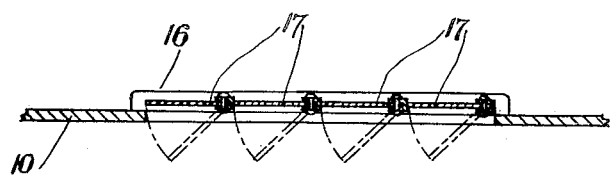
Fig. 5 is a section through the shutter vanes the dot and dash lines showing them in their open position, and, Fig. 6 is a perspective view of one of the vanes.
Figure 6:
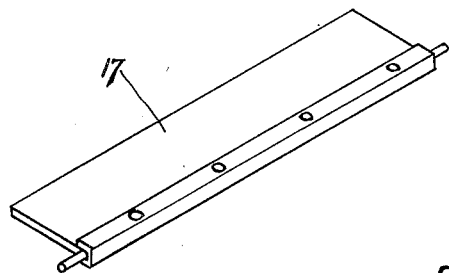

In the center of two of the portions 12 only the third portion 12 being the masking blade, during the eclipse by which the film shift occurs, is cut a rectangular window in which is inserted a frame 16. In this frame 16 are mounted a plurality of parallelly arranged oscillating vanes 17, which when closed, as shown in Figs. 1 and 2, completely cover the rectangular window and prevent any light passing therethrough. Attached to the inner end of each vane, and at one side of the pivot point thereof is a projecting arm 18, the outer end of which is bent to pass through a perforation in a connecting bar 19. A movement of this connecting bar 19 across the direction of length of the vanes 17 will cause a simultaneous movement of all the vanes in a frame 16, from open to closed position or vice versa. Slidably and rotatably mounted on the shaft 14 and on the side of the shutter plate 10 remote from the hub 13 is a hub 20 on which is mounted a plurality of tangentially arranged arms 21 one for each frame 16. A connecting rod 22, pivotally mounted at its ends to the outer end of the arm 21 and the center of the connecting bar 19 connects the vanes 17 to the hub 20. A three arm centrifugal ball governor comprising spring arms 23 attached at their ends to the hubs 13 and 20, and provided with weights 24 at their middle points governs the position of the hub 20 with respect to the hub 13. The resiliency of the spring arms 23 is such that when the shaft 14 is at rest or rotating at normal speed, the hub 20 will maintain the vanes 17 in closed position. As the speed of the shaft increases above normal the weights 24 will rotate in ever increasing circles, drawing the hub 20 nearer and nearer to the hub 13 and gradually opening the vanes, thus allowing more and more light to be projected through the rectangular windows onto the screen.

What I claim as my invention and desire to obtain by Letters Patent is:—

1. A shutter for cinematograph machines having a plurality of equally spaced openings between which are opaque portions, a hole in at least one of said opaque portions and adjustable means whereby said hole may be covered and uncovered.

2. A shutter for cinematograph machines having a plurality of equally spaced openings between which are opaque portions, a hole in at least one of said opaque portions and an adjustable shutter device, located over said hole and means for opening and closing said shutter to vary the amount of light allowed to pass through said hole.

3. A shutter for cinematograph machines, comprising a disk provided with a central hub which hub is attached to a driving spindle, said disk having a plurality of equally spaced openings between which are opaque portions, a hole in at least one of said opaque portions and an adjustable shutter device, located over said hole and a governor mounted on said spindle for opening and closing said shutter to vary the amount of light allowed to pass through said hole.

4. A shutter for cinematograph machines having a plurality of equally spaced openings between which are opaque portions, a hole in at least one of said opaque portions and an adjustable shutter device, comprising a number of parallel vanes pivotally mounted and located over said hole and means for opening and closing said shutter to vary the amount of light allowed to pass through said hole.

5. A shutter for cinematograph machines, comprising a disk provided with a central hub which hub is attached to a driving spindle, said disk having a plurality of equally spaced openings between which are opaque portions, a hole in at least one of said opaque portions and an adjustable shutter device, comprising a number of parallel vanes pivotally mounted and located over said hole and a governor mounted on said spindle for opening and closing said shutter to vary the amount of light allowed to pass through said hole.

6. A shutter for cinematograph machines having a plurality of equally spaced openings between which are opaque portions, a hole in at least one of said opaque portions and an adjustable shutter device, located over said hole and means for opening and closing said shutter to vary the amount of light allowed to pass through said hole, in proportion to the speed of the shutter.

7. A shutter for cinematograph machines comprising a disk provided with a central hub which hub is attached to a driving spindle, said disk having a plurality of equally spaced openings between which are opaque portions, a hole in at least one of said opaque portions and an adjustable shutter device located over said hole and a governor mounted on said spindle for opening and closing said shutter to vary the amount of light allowed to pass through said hole, in proportion to the speed of the shutter.

8. A shutter for cinematograph machines having a plurality of equally spaced openings between which are opaque portions, a hole in at least one of said opaque portions and an adjustable shutter device, comprising a number of parallel vanes pivotally mounted and located over said hole and means for opening and closing said shutter to vary the amount of light allowed to pass through said hole, in proportion to the speed of the shutter.

9. A shutter for cinematograph machines, comprising a disk provided with a central hub which hub is attached to a driving spindle, said disk having a plurality of equally spaced openings between which are opaque portions, a hole in at least one of said opaque portions and an adjustable shutter device, located over said hole and a governor mounted on said spindle for opening and closing said shutter to vary the amount of light allowed to pass through said hole, in proportion to the speed of the shutter.

EDWARD TASSIE.